(12) United States Patent
Proshin et al.

(10) Patent No.: US 10,379,868 B1
(45) Date of Patent: Aug. 13, 2019

(54) OPTIMIZATION METHOD WITH PARALLEL COMPUTATIONS

(71) Applicant: Bell Integrator Inc., San Jose, CA (US)

(72) Inventors: Dmitry Ivanovich Proshin, Penza (RU); Andrey Ivanovich Korobitsyn, Saratoga, CA (US)

(73) Assignee: Bell Integrator Inc., San Jose, CA (US)

( * ) Notice: Subject to any disclaimer, the term of this patent is extended or adjusted under 35 U.S.C. 154(b) by 0 days.

(21) Appl. No.: 16/266,480

(22) Filed: Feb. 4, 2019

(51) Int. Cl.
G06F 9/38 (2018.01)
G06F 9/48 (2006.01)
(Continued)

(52) U.S. Cl.
CPC .......... G06F 9/3877 (2013.01); G06F 9/4806 (2013.01); G06F 17/11 (2013.01); G06T 1/20 (2013.01)

(58) Field of Classification Search
CPC ...... G06F 17/11; G06F 9/3877; G06F 9/4806; G06T 1/20
(Continued)

(56) References Cited

U.S. PATENT DOCUMENTS 5,590,063 A * 12/1996 Golio .................. G06Q 10/04
702/119
7,257,807 B2 * 8/2007 Nikitin .................. G06F 8/314
712/206

(Continued)

Primary Examiner — Tan V Mai
(74) Attorney, Agent, or Firm — Bardmesser Law Group (57) ABSTRACT

Optimization method with parallel computations, including performing multiple stages of calculating target function of P independent parameters using GPUs, wherein entire one-dimensional array of the calculated values of the target function of length $$\prod_{j=1}^{P} W_j$$

that needs to be computed is divided into groups of size $\eta$ and calculated in parallel at

$$L = \prod_{j=1}^{\eta} W_j$$

$\eta$ parameter points; a number of simultaneously calculated parameters $\eta$ in each group and a number of calculation points $W_j$ of the target function at interval $D_j$ for each j-th desired parameter in the group is selected based on a possible number of parallel calculations $R = G \cdot M \cdot T$, where G is number of GPUs, M is number of cores in each GPU, T is number of threads in each core; and outputting the calculated P parameters for the global extremum of the target function, wherein a full cycle of calculating points is carried out for consecutive iterations, defined as integer division $$\left\lceil \frac{L}{R} \right\rceil,$$

rounding up.

5 Claims, 6 Drawing Sheets

(51) Int. Cl.
*G06F 17/11* (2006.01)
*G06T 1/20* (2006.01)

(58) Field of Classification Search
USPC .......................................................... 708/524
See application file for complete search history.

(56) References Cited

U.S. PATENT DOCUMENTS

| | | | | |
|---|---|---|---|---|
| 8,255,344 | B2 * | 8/2012 | Ferringer | G06N 3/086 |
| | | | | 706/13 |
| 8,316,360 | B2 * | 11/2012 | So | G06F 8/451 |
| | | | | 717/159 |
| 8,627,300 | B2 * | 1/2014 | Kruglick | G06F 8/443 |
| | | | | 717/149 |
| 9,235,396 | B2 * | 1/2016 | Ke | G06F 8/453 |
| 9,659,253 | B1 * | 5/2017 | Ghaddar | G06F 17/11 |
| 2005/0197977 | A1 * | 9/2005 | Buck | G06F 17/16 |
| | | | | 706/12 |
| 2009/0135180 | A1 * | 5/2009 | Li | G06T 1/20 |
| | | | | 345/420 |
| 2013/0275722 | A1 * | 10/2013 | Yap | G06F 9/30145 |
| | | | | 712/208 |
| 2018/0180428 | A1 * | 6/2018 | Grimm | G01C 21/20 |

\* cited by examiner

OPTIMIZATION METHOD WITH PARALLEL COMPUTATIONS

BACKGROUND OF THE INVENTION

Field of the Invention

The present invention relates to computers and may be used for multi-dimensional optimization of technical, economic and technological processes, for solving of optimization tasks of resource distribution, network planning and management, for determining of optimum parameters of multi-factor dependencies and technological processes, for identification of control object models, and for solving optimum control tasks over industrial objects and processes.

Description of the Related Art

There are various conventional optimization methods, which relate to parallel computations of the target function and selection of extreme values [1-14] among the computed ones at each iteration. Generally, many real-world mathematical problems reduce to the task of finding a global minimum (or maximum) of a function. The search for a global optimum relies on generation of a certain coverage (grid) in the parameter area and selection of the best function value in this grid. With increasing dimensionality of the task, computation costs to solve it increase exponentially (so-called "dimensionality curse").

In order to reduce the amount of computation, uneven search area coverage is generated: the grid is structured to be rather dense around the global optimum, and the farther away from the solution, the sparser it becomes. Uneven coverage allows to increase the dimensionality of global optimization tasks by a factor of two or three times. However, in order to generate such coverage, the numerical global search methods themselves have to be more complex.

There are other conventional optimization methods aimed at reducing the information processing time through parallel computations of the target function based on dividing the solution area between CPUs to solve sub-tasks in these sub-areas simultaneously. However, such approach is not efficient, since when the search area is divided into sub-areas, only a handful of CPUs (in the worst case, only one CPU) will be working on the task in the sub-area that contains the global minimum to be found, while the rest will be working on the task in sub-areas that do not contain the solution.

There are other conventional methods, which are based on parallelizing the computations of the target function that describes the object to be optimized. Such methods may boost the process somewhat, but they are highly customized to solve only specific tasks.

Optimization methods, which are based on parallelizing the algorithm computation rules that allow to select the point where to carry out another test, depend on the specific algorithm class. Additionally, the computation rules themselves are usually quite simple, so one would not gain much by parallelizing them, as overhead costs to organize such parallelizing may completely negate the improvement.

The most promising optimization methods include those based on changing the algorithms in order to carry out several tests simultaneously, as they have the advantages of being efficient (i.e., it is the main bulk of computations that is parallelized) and generalized (i.e., it may be applied to a wide range of characteristic algorithms for multi-extremal optimization). At the same time, this approach allows to efficiently employ heterogeneous computing resources or contemporary supercomputers, such as CPU cores, graphic accelerators, and math coprocessors.

U.S. Pat. No. 5,590,063, entitled "Optimization method using parallel processors", issued on Dec. 31, 1996, discloses a method for numerical optimization of arbitrary functions in a computer-based model using parallel CPUs. This method initializes each CPU with an initial estimated value of the parameter to be optimized. To determine the solution, this initial estimate is then determined in each CPU. Then, the most accurate estimated parameter value is selected from the output of each CPU, so that one or several parallel CPUs with the most accurate estimated parameter value are set to run in the gradient mode, while the rest of CPUs operate in the randomized mode. Estimated parameter values obtained from CPUs operating in the randomized mode are assessed until one of the CPUs operating in the gradient mode produce a local minimum.

The drawbacks of this known optimization method consist in that it is difficult to implement as it has a lot of extra requirements and restrictions, it spends much time on optimization, it has a high risk of converging to local minima, and it is difficult to be parallelized.

U.S. Pat. No. 5,590,063, entitled "Parallel dynamic optimization", issued on Jan. 7, 2014, discloses a method and system for parallel dynamic optimization using multi-core CPUs. Completion time compiler may be adapted to generate several copies of the executable code from a portable intermediate software module, wherein different copies of the executable code may be generated with variable optimization parameters, so that each copy of the executable code represents an individual optimization attempt. A multi-core CPU may be employed to execute some or all different copies of the code. Preferred optimization parameters are determined based on the copies of the executed code that would be completed correctly in the smallest amount of time, or that would use the lowest amount of memory, or that would prove to be the best according to some other assessment indicators. The preferred optimization parameters may be used to compute any future optimization attempts. The output from the preferred copies of the code may be used as the result of the first iteration.

The main drawback of this known optimization method is that it is difficult to implement as well as difficult to be parallelized, and it has a high risk of converging to local minima.

U.S. Pat. No. 5,590,063, entitled 9659253 "Solving an optimization model using automatically generated equations in a parallel and collaborative method", issued on May 23, 2017, discloses the method, device, and software product for solving an optimization model through automatic creation of alternative statements and solution of tasks that involve parallel approaches to problem-solving. The method comprises automatic generation of alternative statements for the given optimization model; parallel communicative approaches to solution in the parallel computation infrastructure in order to solve a given set of alternative model statements; use of the mechanism for automatic determination of the model structure, as well as the mechanism for automatic determination of the suitable approach to solution for the given model structure; and running of several parallel approaches to solution on existing optimization solvers. The system and methods provide connection between parallel solution approaches in order to improve performance. The system provides information exchange between parallel solution approaches during solution in order to improve performance. The information that is exchanged includes information about upper and lower boundaries of working algorithms, as well as information about variables for allowable intermediate solutions.

The main drawback of this known optimization method is that it puts a relatively heavy workload on the CPU, thus requiring to use a high-performance CPU, and that it is difficult to implement, as it has a lot of extra requirements and restrictions, spends indefinite time on optimization, and has a high risk of converging to a local minima only.

Still another known patent is RU 2191425 "Optimization method for parallel information processing that minimizes processing time", published on Oct. 20, 2002, designed to be used in local area networks (LAN) comprising workstations (WS), among which there is one main workstation and several remote ones, wherein the main workstation distributes individual computation processes that make up the task to be solved, between the remote workstations, the method involving determination of the optimum number of information processing processes that are run simultaneously by the workstations. The objective is achieved by distributing the individual computation processes among the remote workstations with the lowest CPU time load, while the optimum number of processes to be run simultaneously is determined by the main workstation based on the predefined conditions. The objective of this known solution is to propose a method for optimal parallel information processing in order to minimize the information processing time. The objective is maximizing the usage of LAN resources while also minimizing the information processing time, putting restrictions on computing costs by employing the optimum number of workstations.

This objective is achieved by a conventional information processing method comprising determination of the optimum number of processes to be used to process information, wherein the optimum number of processes is determined according to the following conditions:

$$\begin{cases} T = c + \dfrac{d}{X} \to \min \\ k(aX + b)\left(c + \dfrac{d}{X}\right) \leq S \\ 1 \leq X \leq P, \text{ integer,} \end{cases}$$

where T is the time needed to solve the task;
S is the maximum cost of solving the task;
P is the number of PCs in the set;
k is the proportionality coefficient;
a is the cost of one PC;
b is the total cost of the collectively used resources, such as communications channels (CC), shared input devices (SID), shared memory devices (SMD), and shared output devices (SOD);
c is the time spent to make the computations;
X is the number of PCs;
d is the time one PC needs to solve the task.

The drawbacks of most conventional optimization methods are that they are difficult to implement, involve a lot of extra conditions and limitations, do not offer a determinate optimization time and high probability of converging to local minima, are difficult to be parallelized (i.e., each next step depends on the previous one), and also produce a rather heavy workload, thus requiring a high-performance CPU.

SUMMARY OF THE INVENTION

Therefore, the objective of the present solution is an optimization method that would be simple to implement, will not require a high-performance CPU, will reduce the risk of finding (converging to) local minima, and reduce CPU workload.

In accordance with the preferred embodiments of the claimed method, such applications as, e.g., volatility curve modeling, the resulting model will be more precise, have higher speed and be less prone to finding (converging to) local minima.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

The objective is to reduce optimization time and to utilize computational system's resources to the fullest extent, as well as to increase parameter determining accuracy and to guarantee finding (converging to) a local minima of the target function.

The claimed optimization method includes the following steps: from the total set of parameters P of the target function, randomly forming groups of dimension (η) parameters for each factor to be simultaneously computed in W points; simultaneously computing the target function in points L of the space of the group of parameters to be computed, the points defined with a specified discreteness; selecting parameter values that correspond to the optimization function extremum; reducing the search interval in the space of parameters to be computed in each iteration up to two times the current discretization value for each parameter in the selected group. Based on the accuracy assessment of the computed η parameters, it is decided whether to stop searching for an extremum or to continue the search in the given group of parameters by forming another group of parameters from the remaining set of target function parameters P.

In each optimization cycle, the make-up of η groups of factors is randomized, the entire array of initial input data is converted into a η-dimensional space, and computations are parallelized, providing for determination of the target function extremum (i.e., minimum or maximum value) of the given accuracy in the space of selected parameters. After this, another group of factors is formed, and their optimum values are determined. Optimum factor values are determined in the newly composed group starting from the initial interval, based on the values of other factors that have already been determined.

The claimed optimization method is preferably implemented using Graphical Processing Units (GPU). Initial input data include the names and the number of target function parameters P, the lower and upper boundary values (bl and bh), the variation range D=bh−bl for each parameter, and the number of points W to be computed in the interval D, as well as the GPU parameters, such as number of GPU cores M, the number of simultaneously processed threads T in each GPU, and the total number of the GPUs G.

The possible number of parallel computations carried out by the hardware in use is:

$$R = M \cdot T \cdot G. \qquad (1)$$

Each parameter from the group of η-parameters to be computed simultaneously may be defined in $W_1, W_2 \ldots W_\eta$ points correspondingly. The total number of points of the target function $f(P)$ to be computed simultaneously (in parallel) in the parameter space is:

$$L = \prod_{j=1}^{\eta} W_j. \qquad (2)$$

If each η parameter is defined in W points, i.e. $W_1 = W_2 = W_3 = \ldots = W_{dim}$, then the total number of points of the target function $f(P)$ to be computed simultaneously (in parallel) in the η parameter space in W points for each factor, according to (2), is determined by the following statement:

$$L = W^\eta. \qquad (3)$$

When L exceeds the possible number of parallel calculations of the used equipment R (see equation (1)), the full cycle of calculating L points is carried out for the number of consecutive iterations λ, defined as an integer division of L by R with rounding up $$\lambda = \left\lceil \frac{L}{R} \right\rceil. \qquad (4)$$

Given equations (1) and (4), the total number of points of the target function calculated in parallel in the η parameter space through the parameters of the used GPUs is found by equation $$L = \lambda \cdot R = \lambda \cdot G \cdot M \cdot T \qquad (5)$$

If the number of independent factors P of the target function $f(P)$ and the parameters of the equipment in use are provided, then the equation (1) may be used to determine the possible number of parallel computations L. The number of η parameters to be simultaneously computed and the number of groups γ to be formed in each optimization cycle of all factors P of the target function may be determined, in accordance with equation (3), using the following equations:

$$\eta = \frac{lgL}{lgW}; \gamma = \frac{P}{\eta} = \frac{PlgW}{lgL}. \qquad (6)$$

If the number of independent factors P of the target function $f(P)$, along with the selected number of points W in the given interval D for each factor in the space P to be determined, as well as the number of η parameters to be computed, are provided, then equation (2) or (3) may be used to determine L, which is a part of the equation (5) used to determine the equipment parameters.

The discreteness $\Delta_{j,i+1}$ in the $(i+1)^{th}$ optimization iteration for each $j^{th}$ parameter of the group of η-parameters to be simultaneously computed may be determined with the following statement:

$$\Delta_{j,i+1} = \Delta_{j,i}/(W_j-1). \qquad (7)$$

The discreteness $\Delta_{j,i}$ of the changes in each $j^{th}$ parameter in the $i^{th}$ iterarion ($i \in [1, N_j]$) with the constant number of points Wj for each coordinate in each iteration, with the initial interval Dj, in accordance with (7), mat be determined using the following equation:

$$\Delta_{j,i} = \frac{2^{i-1}D_j}{(W_j-1)^i}, i \in [1, N_j]. \qquad (8)$$

By equating $\Delta_{j,i} = \varepsilon_j$, according to the equation (8), it is possible to determine the necessary number of iterations Nj in each optimization cycle within the necessary error $\varepsilon_j$ for each parameter of the η group to be computed:

$$N_j = \frac{lg(D_j/2\varepsilon_j)}{lg(W_j-1)-lg2}. \qquad (9)$$

Equation (9) allows to determine the number of optimization iterations for each parameter and thus may be used to determine the number of points $W_j$ for each coordinate with additional restrictions on the number of iterations.

Under the condition of the same number of optimization iterations for each parameter, and having determined the number of points $W_\alpha$ of division of the initial interval $D_\alpha$ for the selected parameter α, equation (9) is used to determine the number of iterations $N_\alpha$ for the coordinate α, which is necessary to achieve the given accuracy $\varepsilon_\alpha$:

$$N_\alpha = \frac{lg(D_\alpha/2\varepsilon_\alpha)}{lg(W_\alpha-1)-lg2}$$

Based on the condition $N_1 = N_2 = \ldots N_\alpha$, equation (8) or (9) is used to calculate the following:

$$W_j = \left\lceil 2^{N_\alpha}\sqrt{\frac{D_j}{2\varepsilon_j}} + 1 \right\rceil. \qquad (10)$$

Based on equation (10), the number of points $W_j$ for each parameter is determined.

In case the values of intervals D, the number of points W for computation of the target function within each optimization interval, and the error $\varepsilon$ are the same for each parameter to be computed, e.g., when the proposed method is used to identify the parameters of a neural network, then the discreteness value in each optimization iteration is the same for the entire group of parameters to be simultaneously computed, and, in the $(i+1)^{th}$ iteration, equals:

$$\Delta_{i+1}=\Delta_i/(W-1) \quad (11)$$

The discreteness $\Delta_i$ of changes in each parameter in $i^{th}$ iteration ($i \in [1, N_j]$), with initial interval duration D and the number of points W, in accordance with (11), is determined using the following equation:

$$\Delta_i = \frac{2^{i-1}D}{(W-1)^i}, i \in [1, N_j], \quad (12)$$

while the necessary number of iterations N in each optimization cycle with the necessary error $\varepsilon$ of the group of $\eta$ parameters to be computed is determined using the following statement:

$$N = \left\lceil \frac{lg(D/2\varepsilon)}{lg(W-1)-lg2} \right\rceil. \quad (13)$$

Equations (11)-(13) are specific cases of the equations (7)-(9).

The number of each $i^{th}$ element value of the target function array in the one-dimensional space, which are computed simultaneously, may vary from 0 to L, which corresponds to variations of points for each $j^{th}$ parameter in the range from 0 to $W_j$. Therefore, the entire array of the initial information may be divided into groups of parameters to be computed simultaneously in L points.

Each point in the $\eta$-dimensional space is defined by a vector of $\eta$ components. Each element number $\alpha_j$ of the target function array in the $\eta$-dimensional space for each coordinate varies within the interval of $[0,W_j-1]$. Number changes in the one-dimensional space from 0 to $$\prod_{j=1}^{\eta} W_j$$

correspond to transformations of $\eta$ coordinates in the $\eta$-dimensional space. Point number values may be represented through the coordinates of the $\eta$-dimensional space in the form of the sum of products of element coordinate numbers $\alpha_j$ of the target function array by corresponding products of the number of points $W_j$ of division of each parameter interval in each iteration:

$$i = \alpha_1 \prod_{k=1}^{\eta-1} W_k + \alpha_2 \prod_{k=1}^{\eta-2} W_k + \dots + \alpha_\eta = \sum_{j=1}^{\eta-1} \alpha_j \prod_{k=1}^{\eta-j} W_k + \alpha_\eta. \quad (14)$$

The proposed algorithm for converting the one-dimensional array of values of the parameter group to be optimized, varying from 0 to L, into a $\eta$-dimensional space in accordance with (13), includes the following steps:

1. Computing the element value number at the first coordinate of the $\eta$-dimensional space of the target function by exactly dividing the initial number i of the one-dimensional array element by the product of $$\prod_{k=1}^{\eta-1} W_k$$

$$\alpha_1 = \left\lfloor \frac{i}{\prod_{k=1}^{\eta-1} W_k} \right\rfloor. \quad (15)$$

2. Computing the remainder of the exact division carried out in step 1:

$$Q_1 = i \bmod \prod_{k=1}^{\eta-1} W_k = i - \alpha_1 \prod_{k=1}^{\eta-1} W_k. \quad (16)$$

3. Repeatedly computing the remainder $Q_j$ of the integer division of the remainder $Q_{j-1}$ ($Q_0=i$) of the previous iteration by the product of $$\prod_{k=1}^{\eta-j} W_k,$$

wherein j changes from 1 to $\eta-1$:

$$Q_j = Q_{j-1} \bmod \prod_{k=1}^{\eta-j} W_k = Q_{j-1} - \alpha_j \prod_{k=1}^{\eta-j} W_k. \quad (17)$$

4. Computing element value numbers at the following coordinates of the $\eta$-dimensional space of the target function by repeatedly carrying out exact division of the remainder computed in the previous step by the product of $$\prod_{k=1}^{\eta-j} W_k,$$

where j is from 1 to $\eta-1$:

$$\alpha_j = \left\lfloor \frac{Q_{j-1}}{\prod_{k=1}^{\eta-j} W_k} \right\rfloor,$$

at j=$\eta$ $$\alpha_\eta = Q_{\eta-1}. \quad (18)$$

If the interval values are D, the number of points W for target function computation in each optimization interval, as well as the error ε are the same for each parameter to be computed, then equations (14)-(18) can be simplified:

$$i = \alpha_1 W^{\eta-1} + \alpha_2 W^{\eta-2} + \ldots + \alpha_\eta W^0 = \sum_{k=1}^{\eta} \alpha_k W^{\eta-k};$$

$$\alpha_1 = \left\lfloor \frac{i}{W^{\eta-1}} \right\rfloor;$$

$$Q_1 = i \bmod W^{\eta-1} = i - \alpha_1 W^{\eta-1};$$

$$Q_j = Q_{j-1} \bmod W^{\eta-j} = Q_{j-1} - \alpha_j W^{\eta-j};$$

$$\alpha_j = \left\lfloor \frac{Q_{j-1}}{W^{\eta-j}} \right\rfloor.$$

The proposed method for determining optimal values of parameters P, which would minimize the target function ƒ(P), includes the following steps:

1. Based on the input data obtained using the equations (1)-(13), computing the values of L, η, γ, $\Delta_i$, N, $W_j$, $N_j$.

2. The one-dimensional array L of the numbers of the values of the target function is distributed by equations (1)-(6) into groups according to η parameters in the group.

3. In parallel with the use of graphics processing cores, GPU calculates the values of the target function ƒ(P) at $N_v$ points for each parameter in parallel across the entire η parameter group.

4. The value and the number of the element of the array L in the group η of the one-dimensional space, which has the minimum value of the target function ƒ(P), are determined.

Based on the number of blocks in one GPU core, arrays M are formed from the LB calculated values of the goal function in each block. These arrays are then subjected to parallel processing. At each successive iteration, the useful pool of flows of each block is halved, and the array corresponding to the block is divided into two parts $LB_i = \lfloor LB_{i-1}/2 \rfloor$. Each useful stream compares the value of the calculated target function in the corresponding cell of the array from the first part with the cell $cell_1$ symmetric about the center of the partition from the second part $cell_2$. The found extremum value is written in $cell_1$, and the index of the point at which the extremum is found is stored in $cell_2$. If $LB_i$ it has an odd value, then the first stream in the block makes an additional iteration of the comparison with the middle element of the array. The calculations are repeated until each local block has one local extremum value and the corresponding index value of the found point. Among the M local extremes found in each block, define one global extremum in the module. Accordingly, by comparing the G extrema found in the GPU cores, one global extremum of the target function and the index value of the found extremum point are determined.

5. For each parameter from the group of parameters η at each of the $N_v$ iterations in each optimization cycle, the sampling interval is reduced in accordance with equations (7), (11).

6. After $N_j$ iterations, forming another group of η parameters from the remaining set of target function parameters P. In each optimization cycle, the make-up of the η group is randomized.

7. Repeating computation steps 2-6 with the new group of η parameters, starting the search for optimum values in the newly composed group from the initial interval at other parameters values that have already been computed. Computations are repeated for γ groups of η parameters (6) out of the entire set of parameters P.

After determining the minimum values for each group, determine the minimum value of the target function and the number of the array element in the parameter space P.

8. Based on estimated accuracy of the computed parameters, deciding whether to finish or to continue searching for the target function extremum.

9. Based on equations (14)-(18), the found values of the extremum index of the target function are converted into P-dimensional space.

According to the proposed method in step 1, the optimization parameters and the maximum capacity of the hardware used for simultaneous calculations of the target function are determined based on the input data. This provides the optimal choice of parameters that must be calculated simultaneously, and the number of calculation points of the target function for each parameter based on the hardware used. When the optimization problem must be solved for a given number of independent factors P of the target function ƒ(P) with η parameters, which must be calculated simultaneously, and with a predetermined number of points W within a given interval D for each factor, according to equation (5), and hardware selection.

Distributing the one-dimensional array L of the numbers of the target function values to groups of η parameters in the group and calculating the target function at points for each parameter in parallel across the entire group of η parameters, performed in the first, second and third stages, improves the speed of the optimization process and makes rational use of the hardware.

The search for the minimum (or more generally extremum) of the target function with the division of GPU threads into parts, performed at the fourth and fifth stages, ensures the required accuracy and increases the speed of the optimization process, eliminates the risk of a descent to the local minimum in the space of η parameters.

The set of parameters into the group randomly and the beginning of the search from the initial interval for the values of other parameters found earlier, performed at the sixth and seventh stages, reduce the likelihood of hitting the local extremum and increases the reliability of the search for a global extremum. Reducing the interval for each parameter simultaneously in the whole group provides higher calculation speed.

The transformation of the found value of the extremum index of the target function into η-dimensional space ensures the determination of the optimal values of the parameters of the target function with minimal time loss.

Figure 1:
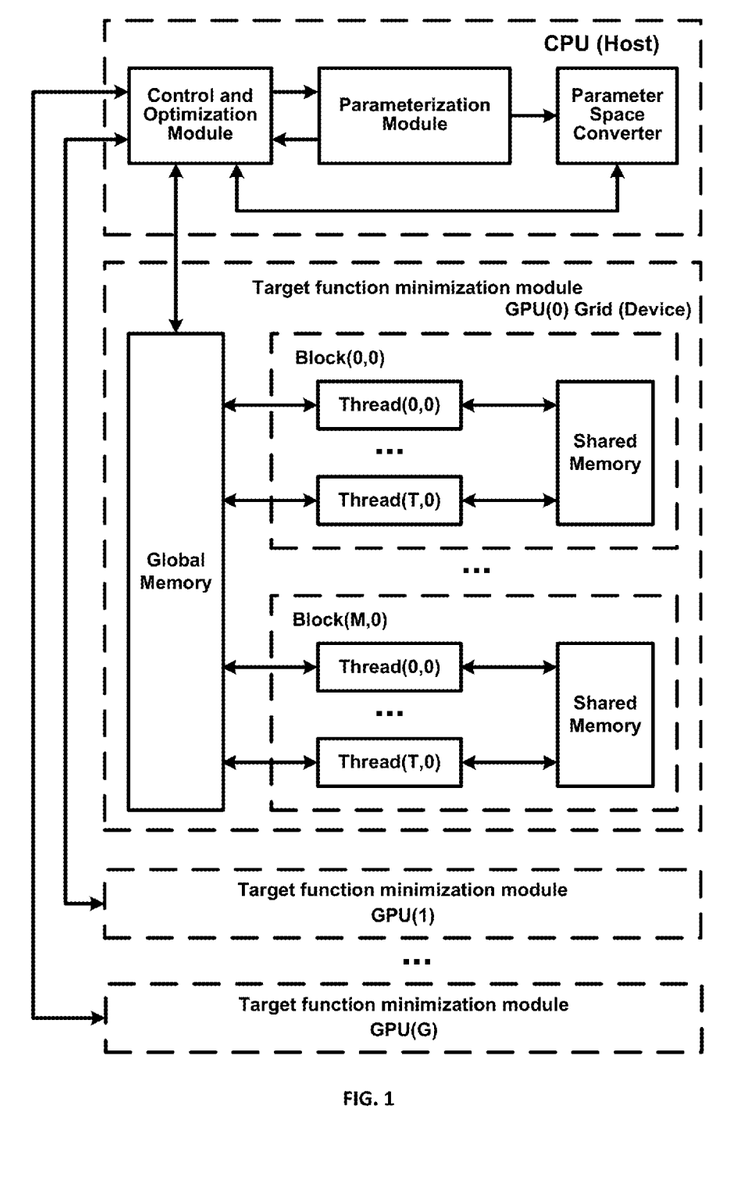
FIG. 1 illustrates the structure of the system performing the proposed method.

The method is implemented in a system that is shown in FIG. 1 that includes several GPUs and a CPU (FIG. 1 should generally be considered in view of FIG. 6, further described below). Generally, the system comprises G GPUs, with M modules each that process T threads simultaneously.

The system using the proposed method operates as follows:

The CPU control and optimization module generates a request for the GPU system, which provides information about the number of GPUs in the system, the number of modules in each GPU, and the number of threads T in each module. Based on this information provided by the GPUs and the input data, including the number of target function parameters P, the lower and upper boundary values (bl and bh), the variation range D=bh−bl for each parameter, and the number of points W to be computed in the interval D in the CPU parametrization module, the system assigns the needed number of modules M, threads T, and GPUs G, then computes the number of parallel computations using the equation (1), (5), and then, using the equations (6)-(9) determines the optimization parameters, the number of η parameters to be simultaneously computed in W points for each factor, the number of groups γ formed in each optimization cycle of all target function factors P, the discreteness $\Delta_i$ of each parameter change in the iteration, and the number of iterations N in each optimization cycle.

Information about experimental data is entered into a global memory of selected GPUs and distributed according to the parameters of the optimization process of the GPU found in the parameterization module, blocks and streams/threads for calculating and storing the values of the target function and indices of the calculated points. The current index number of the calculated value of the target function in each subsequent GPU is shifted by the total number of threads preceding the GPU. Performing in parallel the calculation of the target function at given points of the group of η-parameters is next. Each flow of each GPU block is divided into two parts, and a comparison of the values of the target functions from the separate parts of the flows is carried out in accordance with the procedure described in the fourth stage above. The smaller value is placed in the first cells of the shared memory (Shared Memory) of the corresponding blocks. Then the obtained values are compared again, and the minimum values are selected. The process continues until the minimum value of the target function in the stream is obtained. Similarly, they compare the values of the target function between the blocks. As a result, in the first cell of the total memory of each block, the minimum value of the target function is placed, and in the second cell its number, which is rewritten into the global memory (Global Memory) of each GPU. As a result of comparing the values of target functions in the global memory of each GPU, the minimum value of the target function and its number are allocated, which are transmitted to the control and optimization unit of the CPU. Among the minimum values of the target function obtained in all used GPUs, the smallest is chosen. Next, they carry out similar calculations and search for the index number and the minimum value of the target function for the following groups of parameters. From all the found values of the functions, the minimum value of the function and the point number is selected. The number of the minimum value found in the parameter space transformation module is converted on the basis of equations (14)-(18) into the P-dimensional parameter space. The optimization process continues until a specified accuracy is reached.

The list below contains sample tasks that can be solved using the proposed approach:
  Optimal design (selection of the best nominal technological modes, structural elements, pipeline structures, economic activity conditions, and profitability increase).
  Optimal management.
  Creation of non-linear mathematical models of management objects.
  Social problems, such as stock management, workforce management, or traffic management.
  Identification of neural network parameters for training.
  Parametric identification of mathematical models of technological management objects by their transitional characteristics, and control system synthesis.

Specific aspects of disclosure of the claimed optimization method are best demonstrated by creating a sample volatility estimation model:

$$\sigma = f(x, s, a, b, c, d, e) = a + b*\left(1 - e^{-cy^2}\right) + \frac{d*arctg(e*y)}{e},$$

where
s,a,b,c,d,e are parameters to be adjusted;

$$x = \frac{1}{\sqrt{T}} \ln\left(\frac{Strike}{F}\right)$$

is the horizontal coordinate of the curve; and
y=x−s.

Figure 2:
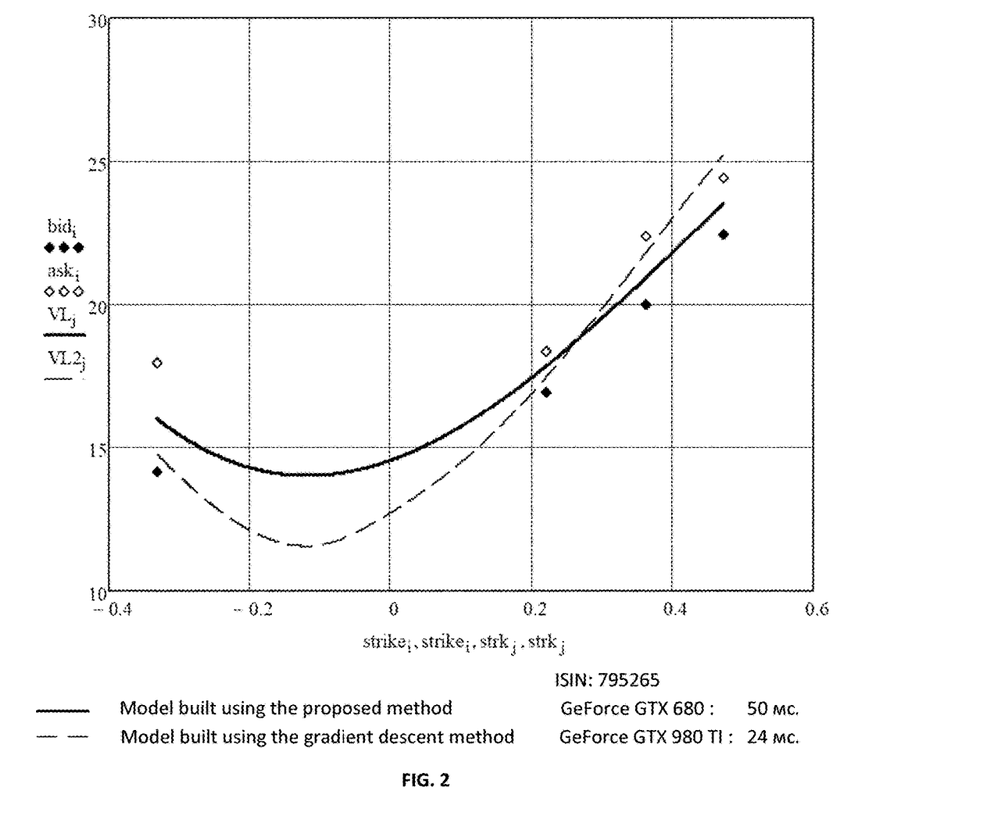
FIG. 2 illustrates the results of applying the proposed method to volatility curve identification.

The task of determining the volatility curve is based on defining the s, a, b, c, d, e parameters of the volatility model, i.e., in its parametrical identification by 6 parameters, which, in turn, requires determining 6 parameters that converge to the minimum of the mean squared error function. FIG. 2 shows a volatility curve corresponding to the parameters that have been determined with the proposed method using formulas (1)-(16) and the gradient descent method, along with experimental data.

The analysis shows that the standard deviation for the curve computed using the claimed optimization method (σ=0.163) (solid line), is nearly one seventh of that computed using the gradient descent method (σ=1.161). The parameter computation time using the proposed method is 50 ms with GeForce GTX 680, and 24 ms with GeForce GTX 980.

Another example of applying the proposed optimization method is determining the parameters of a mathematical model of the benzene concentration dependency on the function of the concentrations of 8 other components, such as carbon monoxide, tin oxide, titanium dioxide, nitrogen oxides, tungsten oxides, indium oxide, as well as temperature, and both relative and absolute air humidity. The resulting mathematical model includes 31 neurons with 1333 coefficients determined with the proposed optimization method using formulas (1)-(16), where the target function is set as a sum of squared deviations of the model from experimental data. The training data set includes 7577 examples, and the test data set includes 1894 examples.

To phrase this in simpler terms: the concentration of benzene depends on 8 independent variables that relate to concentration of other chemicals plus 3 to account for other variables, such as temperature (so, for example, if a polynomial equation with 11 variables is used). The parameters of the model involve, for example, 1333 parameters that need to be found. The 1333 parameters (P=1333) that need to be found are those that give a minimum error of the model. Thus, the "model" represents a black box that, if a neural network is given 11 inputs, it will calculate 1333 parameters, and one output—the actual concentration.

Figure 3:
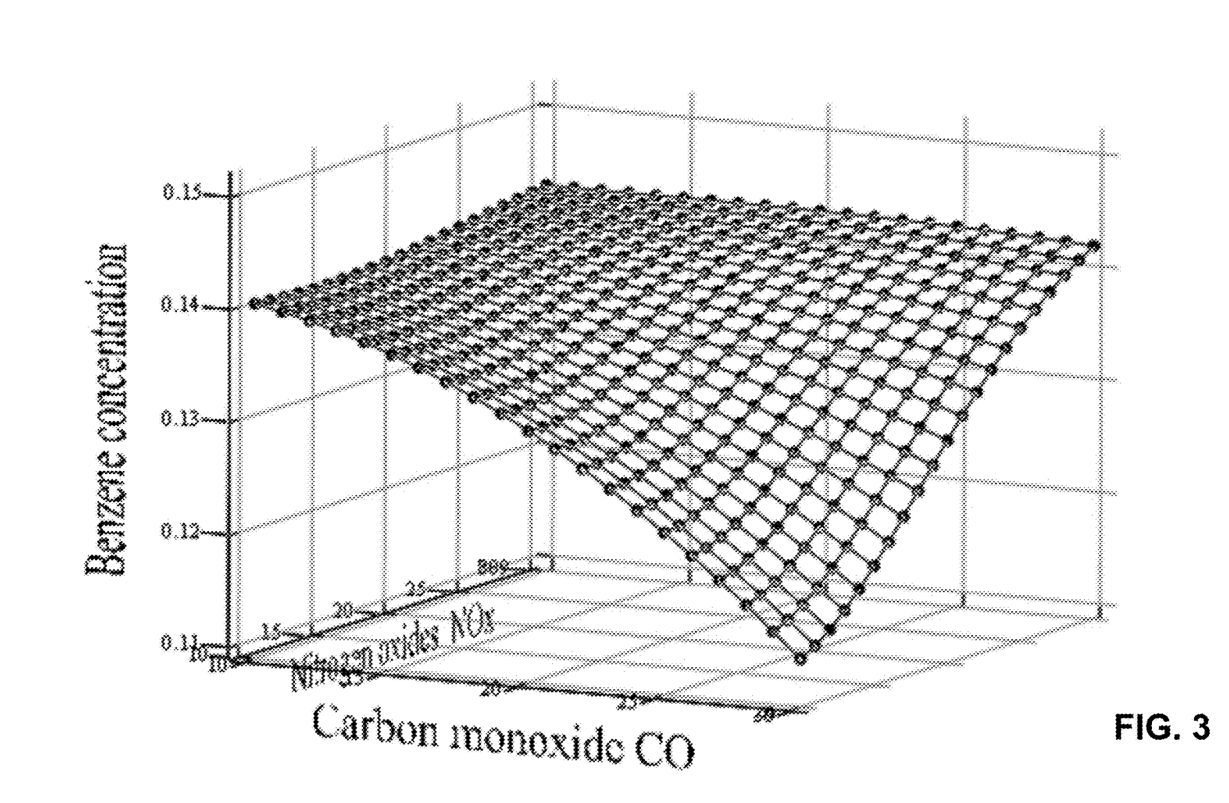
FIG. 3 illustrates application of the proposed method to modeling benzene concentration dependency as a function of concentrations of carbon monoxide and nitrogen oxides.
Figure 4:
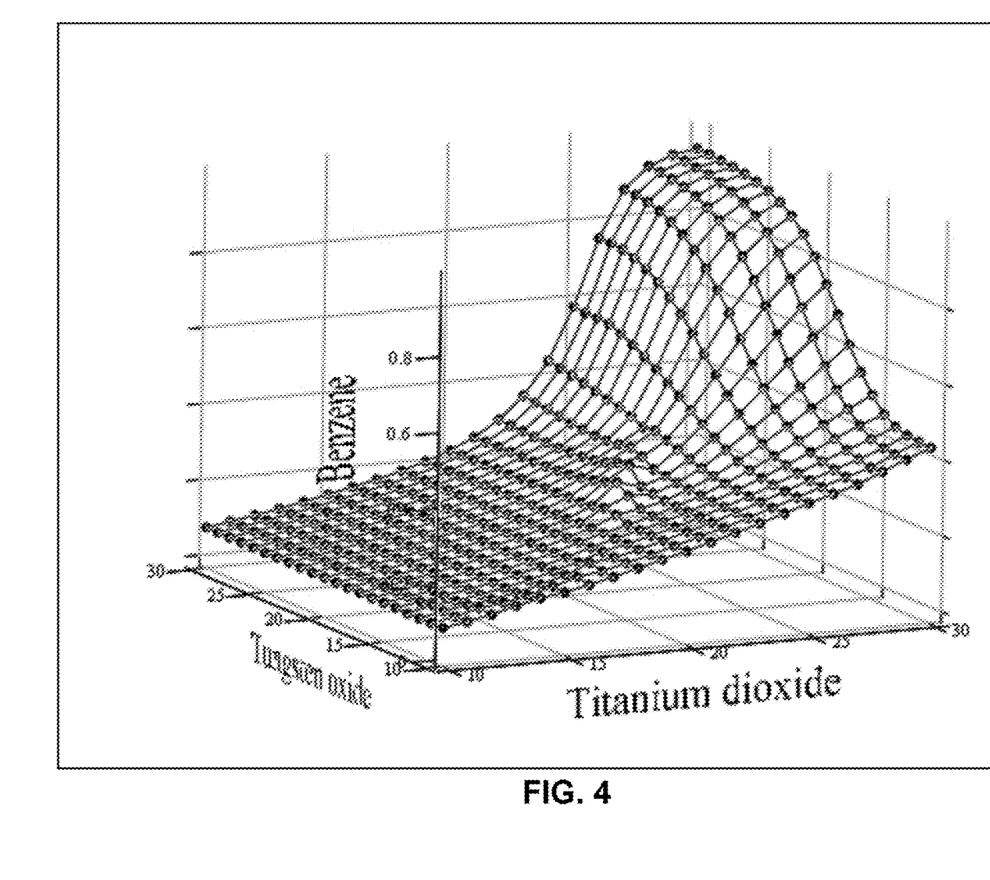
FIG. 4 illustrates application of the proposed method to modeling benzene concentration dependency as a function of concentrations of titanium dioxide and tungsten oxide.
Figure 5:
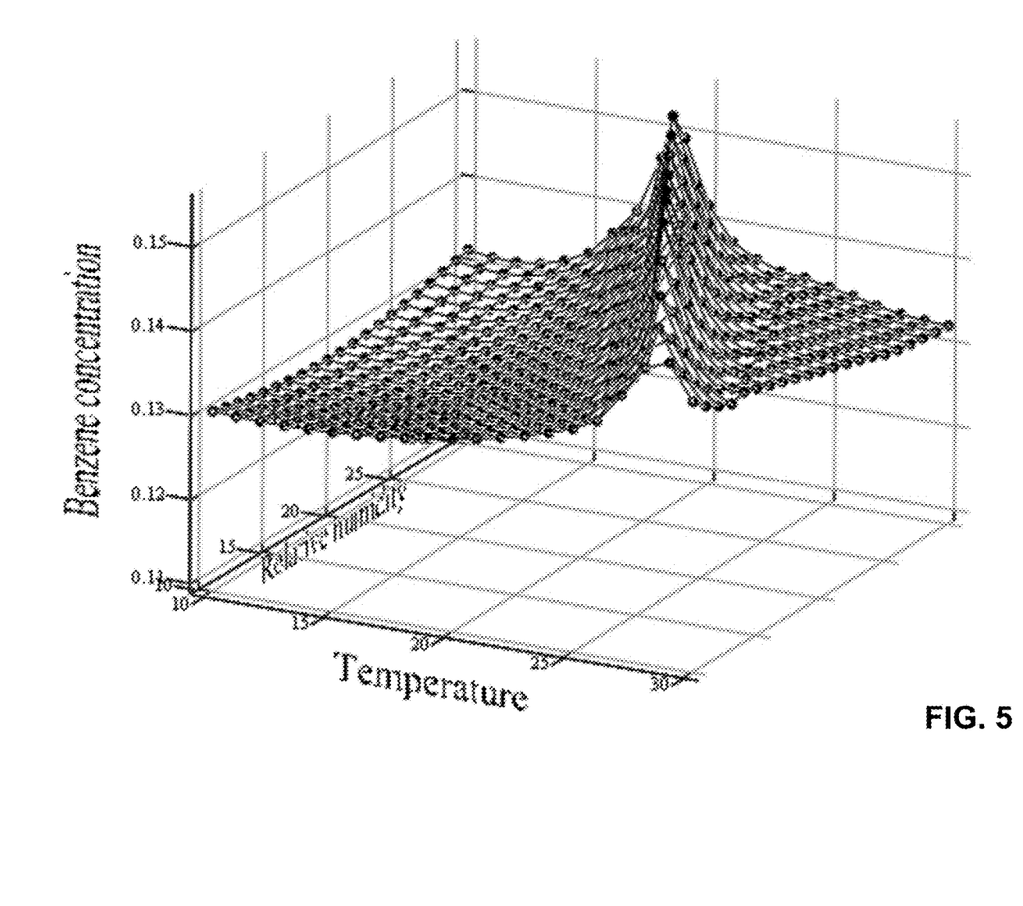
FIG. 5 illustrates application of the proposed method to modeling benzene concentration dependency as a function of concentrations of temperature and relative humidity.

The resulting model in the form of a neural network is illustrated by the graphs of benzene concentration dependencies on the functions of the concentrations of:
  carbon monoxide and nitrogen oxides (this is illustrated in FIG. 3);
  titanium dioxide and tungsten oxide (this is illustrated in FIG. 4);
  temperature and relative humidity (this is illustrated in FIG. 5).

All variables in the graphs are given in relative units. Along the X axis, the variables are given in the number of steps, each step span also given in 0.02 relative units.

The main quality indicators of the model based on the proposed optimization method are determined by the metrics listed in the Table 1 below.

TABLE 1

| No. | Metrics | Name | Training set | Test set |
|---|---|---|---|---|
| 1 | MAE | Mean absolute error between observed and predicted values | 0.001078 | 0.001609 |
| 2 | MAE MAX | Maximum absolute error between observed and predicted values | 0.017036 | 0.010895 |
| 3 | MAE MIN | Minimum absolute error between observed and predicted values | 0.000000 | 0.000003 |
| 4 | $R^2$ | The coefficient of determination | 0.999829 | 0.999478 |
| 5 | RMSE | The square root of the average of squared errors. | 0.001549 | 0.002168 |
| 6 | RMSLE | Error between observed and predicted values (square root of squared average logarithmic error over all observations) | 0.001311 | 0.001852 |

This table shows that the present approach gives an error of on the order of 0.1%, which is quite good—in other words, the model gives a very accurate representation of the trends shown in the data.

Figure 6:
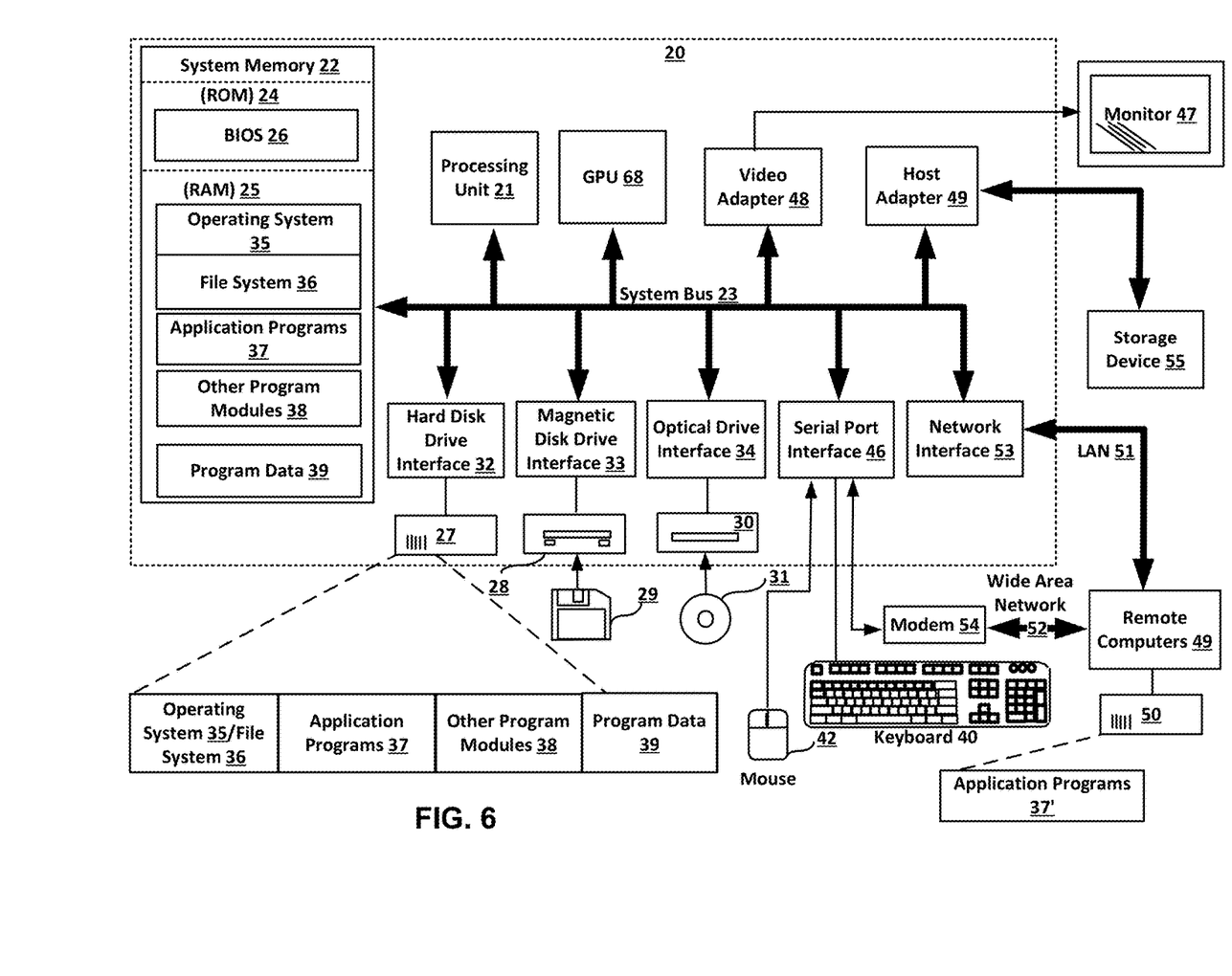
FIG. 6 shows an exemplary system for implementing the invention.

With reference to FIG. 6, an exemplary system for implementing the invention includes a general purpose computing device in the form of a host computer or a server 20 or the like, including a processing unit (CPU) 21, one or more Graphical Processing Units (GPU) 68, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

References (all incorporated herein by reference in their entirety):

1. Ke Qifa et al., U.S. Pat. No. 9,235,396, "Optimizing data partitioning for data-parallel computing" (2016).
2. Nikitin et al., U.S. Pat. No. 7,257,807, "Method for optimizing execution time of parallel processor programs" (2007).
3. Kruglick et al., U.S. Pat. No. 8,627,300, "Parallel dynamic optimization" (2014).
4. So et al., U.S. Pat. No. 8,316,360, "Methods and apparatus to optimize the parallel execution of software processes" (2012).
5. Ferringer et al., U.S. Pat. No. 8,255,344, "Systems and methods for parallel processing optimization for an evolutionary algorithm" (2012).
6. Ghaddar et al., U.S. Pat. No. 9,659,253, "Solving an optimization model using automatically generated equationtions in a parallel and collaborative method" (2017).

7. Golio et al., U.S. Pat. No. 5,590,063, "Optimization method using parallel processors" (1996).
8. V. O. Groppen, A. S. Miroshnikov, Russian Patent No. 2191425, "Method for parallel information processing in order to minimize its time" [Sposob optimizatsii parallelnoy obrabotki informatsii dlya minimizatsii yeyo vremeni] (2002).
9. K. Barkalov, V. Gergel., Multilevel scheme of dimensionality reduction for parallel global search algorithms, OPT-i 2014, An International Conference on Engineering and Applied Sciences Optimization (Kos Island, Greece, 4-6 Jun. 2014), pp. 2111-2124.
10. R. G. Strongin et al., Parallel computations in global optimization problems [Parallelnye vychisleniya v zadachakh globalnoy optimizatsii], Moscow, Moscow University Publishing House, 2013, 280 p.
11. Yu. G. Yevtushenko, V. U. Malkova, A. A. Stanevichius, On parallelizing the global extremum searching process [Rasparallelivaniye protsessa poiska globalnogo ekstremuma], In "Automatics and telemechanics" [Avtomatika i telemekhanika], 2007, No. 5, pp. 45-58.
12. Ya. D. Segreyev, D. Ye. Kvasov, Diagonal global optimization methods [Diagonalnye metody globalnoy optimizatsii], Moscow, Physical & Mathematical Literature [FIZMATLIT], 2008, 252 p.
13. Addis B., Locatelli M., A new class of test function for global optimization, J. Global Optim. 2007, Vol. 38, No. 3, P. 479-501.
14. Liberti Leo, Maculan Nelson, Global Optimization: Scientific and Engineering Case Studies, Ed. by J. D. Pmfer, Berlin: Springer Verlag, 2006, 442 p.

What is claimed is:

1. An optimization method with parallel computations, the method comprising:
performing multiple stages of parallel calculation of values of a target function defined by P independent parameters using computing resources of one or more graphics processors (GPU),
wherein an entire one-dimensional array of the calculated values of the target function of length $$\prod_{j=1}^{P} W_j$$

that needs to be computed is divided into groups of size η that are calculated in parallel at the $$L = \prod_{j=1}^{\eta} W_j$$

η parameter points;
wherein a number of simultaneously calculated parameters η in each group and a number of calculation points $W_j$ of the target function at a given interval $D_j$ for each j-th desired parameter in the group is selected based on a possible number of parallel calculations R=G·M·T,
where G is a number of GPUs, M is a number of cores in each GPU, and T is a number of threads in each core; and
outputting the calculated P parameters that correspond to the global extremum of the target function, and wherein a full cycle of calculating points is carried out for the number of consecutive iterations, defined as integer division $$\left\lceil \frac{L}{R} \right\rceil$$

with rounding up.

2. The method of claim 1, wherein, after forming M arrays out of LB calculated target function values in each GPU core to find local extrema, and wherein for each iteration I, the pool of threads of each core is reduced by half, and the corresponding set of target function values is divided into two parts according to $LB_i = \lfloor LB_{i-1}/2 \rfloor$, and wherein each thread compares the calculated target value in its memory cell of a first part ($cell_1$) with a centrally symmetrical cell ($cell_2$), relative to a center of the division into the two parts, and wherein an index of a point containing the global extremum is stored in the $cell_2$, and wherein, if $LB_i$ is odd, then the first thread in the core further compares the target value with a middle cell, and the calculations are repeated until each core produces a local extremum and its corresponding index, out of M local extrema, with one local extremum found in each core, and out of the G extrema found in the GPU cores, determining one global extremum and its corresponding index value.

3. The method of claim 1, wherein the group of parameters to be calculated in parallel in each optimization cycle is randomized, and the calculation of p parameters that correspond to the global extremum in a newly-formed group starts from an initial interval using values of other parameters that have been already determined, and during each optimization cycle, the optimization interval for the formed group of parameters is reduced by up to two times a discretization value for each parameter in the selected group.

4. The method of claim 1, wherein a number of iterations $N_j$ in each optimization cycle using an error $\varepsilon_j$ of the group of η-parameters being computed is determined based on:

$$N_j = \frac{lg(D_j/2\varepsilon_j)}{lg(W_j - 1) - lg2}$$

and after determining $N_j$ a decision about finishing a search for extrema for the given group of parameters is made.

5. The method of claim 1, wherein an index of the found global extremum of the target function in a one-dimensional space of the parameters P is transformed into a multi-dimensional space of the parameters P by iterative integer division of a remainder $Q_{j-1}$ from the division on a previous iteration (j−1) by $$\prod_{k=1}^{\eta-j} W_k$$

with j varying from 1 to (η−1), wherein a number $\alpha_j$ of elements of coordinates of the η-dimensional space of the target function and the remainder $Q_j$ are computed using:

$$\alpha_j = \left\lfloor \frac{Q_{j-1}}{\prod_{k=1}^{\eta-j} W_k} \right\rfloor;$$

$$Q_j = Q_{j-1} \bmod \prod_{k=1}^{\eta-j} W_k = Q_{j-1} - \alpha_j \prod_{k=1}^{\eta-j} W_k,$$

at $j = \eta$ $$\alpha_\eta = Q_{\eta-1}.$$

\* \* \* \* \*